United States Patent [19]

Onda et al.

[11] 4,114,174
[45] Sep. 12, 1978

[54] SHUTTER OPENING AND CLOSING MECHANISM FOR CAMERAS

[75] Inventors: Eiichi Onda; Masanori Watanabe; Tadashi Nakagawa; Ichiro Nemoto; Mitsuo Koyama, all of Yotsukaido, Japan

[73] Assignee: Seiko Koki Kabushiki Kaisha, Japan

[21] Appl. No.: 766,745

[22] Filed: Feb. 8, 1977

[30] Foreign Application Priority Data

Feb. 9, 1976 [JP] Japan .................................. 51-12960
Feb. 9, 1976 [JP] Japan ............................. 51-13745[U]

[51] Int. Cl.$^2$ .............................................. G03B 9/38
[52] U.S. Cl. .................................................. 354/249
[58] Field of Search .............. 354/245, 246, 247, 248, 354/249

[56] References Cited

U.S. PATENT DOCUMENTS

| | | | |
|---|---|---|---|
| 3,893,134 | 7/1975 | Bräuning | 354/247 X |
| 3,913,112 | 10/1975 | Takahoma | 354/246 X |
| 3,946,414 | 3/1976 | Kitai | 354/246 X |
| 3,984,853 | 10/1976 | Bott et al. | 354/249 X |
| 3,988,754 | 10/1976 | Rentschler | 354/249 X |
| 3,999,196 | 12/1976 | Inoue | 354/249 X |

*Primary Examiner*—Donald A. Griffin
*Attorney, Agent, or Firm*—Robert E. Burns; Emmanuel J. Lobato; Bruce L. Adams

[57] ABSTRACT

A shutter operating mechanism of a camera shutter which has an opening blade and a closing blade operated sequentially to open and close a shutter aperture for an exposure comprises an opening spring normally biasing the opening blade to move from a closed position in which the opening blade covers the shutter aperture to an open position in which the opening blade uncovers the shutter aperture; a second spring normally biasing the closing blade to move from a closed position in which the closing blade covers the shutter aperture to an open position in which the closing blade uncovers the shutter aperture; and a third spring normally biasing the closing blade to move from said open position to said closed position, the arrangement being such that when the shutter is charged, the opening blade and closing blade are in said closed position and when the shutter is released, the closing blade is moved under the bias of said second spring from said closed position to said open position, then the opening blade is moved under the bias of the opening spring from said closed position and to said open position, thereafter the closing blade is returned under the bias of said third spring from said open position to said closed position, thereby completing the exposure. The opening blade may then also be moved to closed position by a fourth spring.

Furthermore, there are provided electrical contacts operated by the movement of the closing blade. When the closing blade is moved to uncover the aperture, the contacts are opened or closed and, after the exposure, are closed or opened again by returning movement of the closing blade to the first position.

9 Claims, 6 Drawing Figures

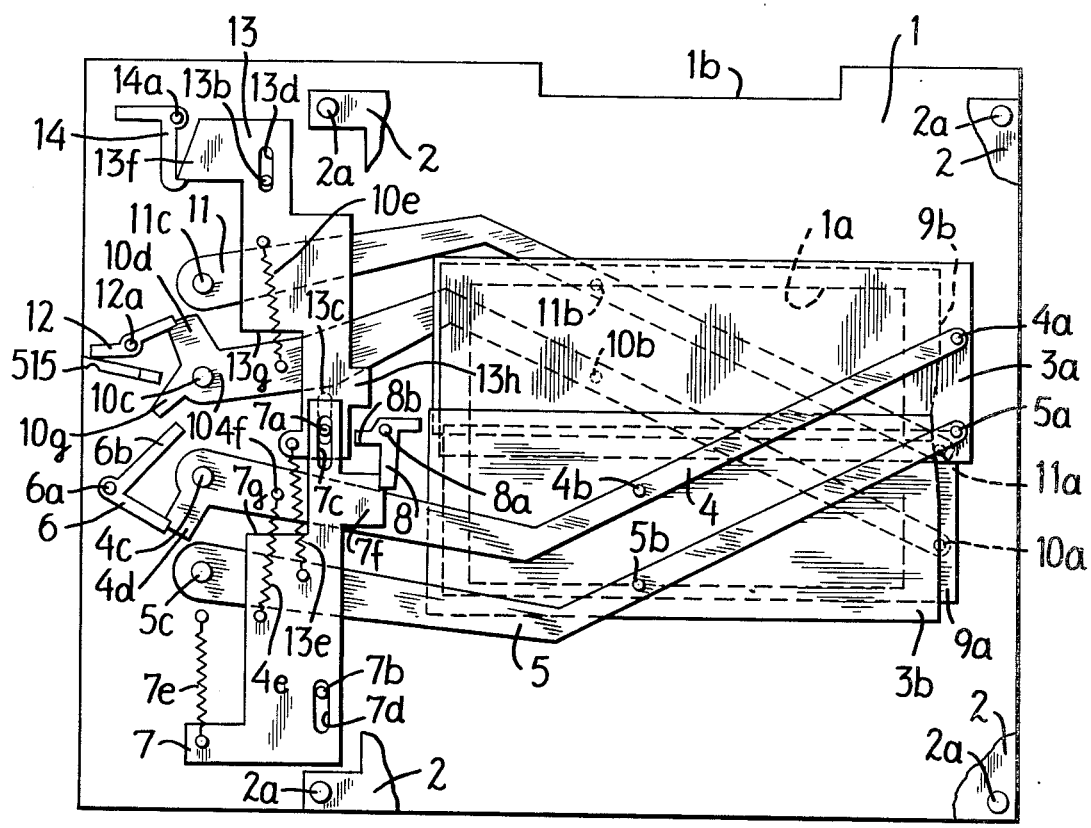

though this is 4,114,174

SHUTTER OPENING AND CLOSING MECHANISM FOR CAMERAS

BACKGROUND OF THE INVENTION

1. Field of the Art

The present invention relates to a shutter opening and closing mechanism for cameras.

2. Prior Art

A plurality of divided shutter blades are operated usually by a shutter operating member to move sequentially through different angles, respectively, thereby opening and closing the aperture. With a focal-plane shutter, an area required to cover the aperture is relatively large and the divided shutter blades tend to become increased in size, thereby necessitating a large space for accommodating the shutter blades therein. Thus, it is difficult to utilize the divided shutter blades in small size cameras. The size of the divided shutter blades also governs the overall size of a single lens reflex camera which finds wide use in recent years, because the shutter blades charged beneath the view finder mounted on top of the camera body travel downwardly of the shutter aperture to effect exposure operation. The spatial limitation makes a shutter with the vertically movable divided blades more disadvantageous than a conventional focal-plane shutter having a horizontally movable curtain. One proposal to reduce the size of the shutter having the divided blades would be to subdivide the blades; however, as the blades are subdivided, the light-interrupting characteristic becomes reduced, thus imposing a limitation on effective subdivision.

SUMMARY OF THE INVENTION

Accordingly, it is an object of the present invention to provide mechanism for opening and closing shutter blades, the shutter and operating mechanism being constructed to make the shutter small and compact.

Another object of the present invention is to provide a shutter having an improved light-interrupting characteristic.

A still further object of the present invention is to provide means for opening and closing electrical contacts necessary for shutter opening and closing operation.

According to the present invention, an opening blade assembly and a closing blade assembly cover a shutter aperture when the shutter is in a charged position. When the shutter is to be released, the closing blade assembly is moved away from the aperture, and the opening blade assembly uncovers the aperture, thereby starting an exposure. Upon lapse of a desired period of time, the closing blade assembly is returned to cover the aperture again to thereby finish the exposure. After the exposure, the opening blade assembly is also returned to cover the aperture additionally. Further in accordance with the invention, electrical contacts are opened or closed by the action of movement of the closing blade assembly away from the aperture. After the exposure, the contacts are closed or opened again by the returning movement of the closing blade assembly.

Many other advantages, features and additional objects of the present invention will become manifest to those versed in the art upon making reference to the detailed description and the accompanying drawings in which preferred structural embodiments incorporating the principles of the present invention are shown by way of illustrative example. Like reference numerals denote like parts throughout the views.

BRIEF DESCRIPTION OF THE DRAWINGS

FIG. 5 is a view similar to FIG. 1 but showing electrical contacts additionally; and FIG. 6 is a fragmentary plan view of the shutter shown in FIG. 1, the shutter having another type of electrical contacts.

DETAILED DESCRIPTION OF THE PREFERRED EMBODIMENTS

Figure 1:
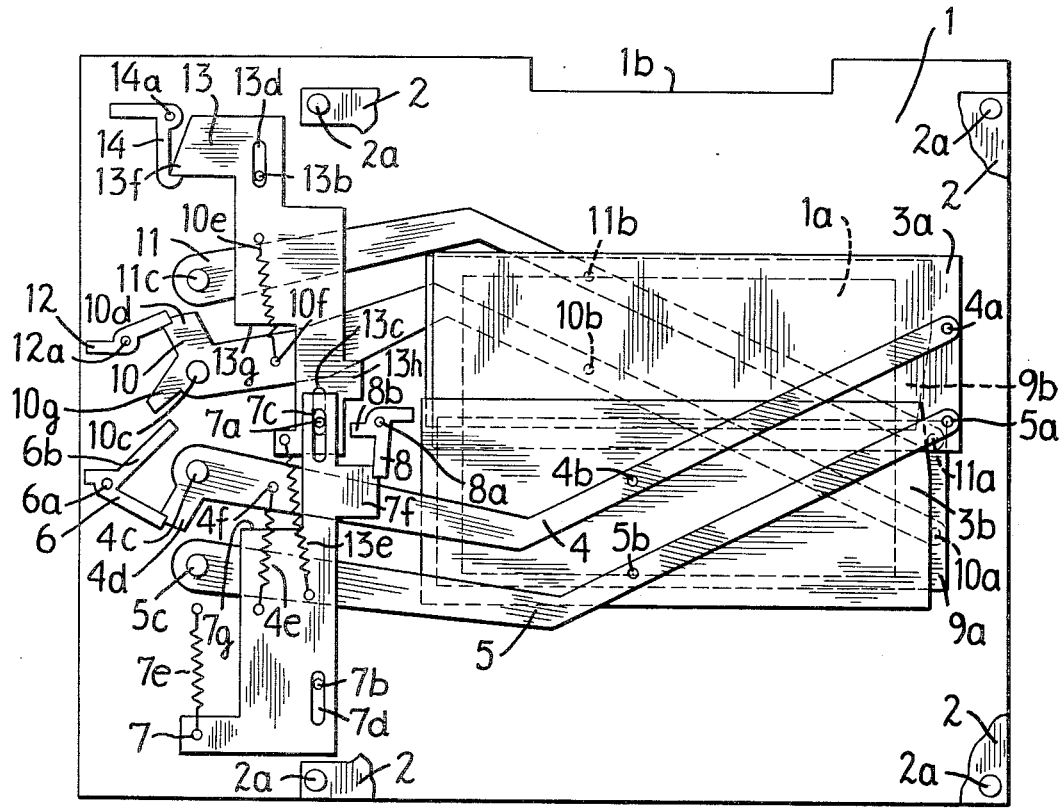
FIG. 1 is a plan view of a shutter provided in accordance with a first embodiment of the present invention, the shutter being illustrated in a charged position.

The principles of the present invention are particularly useful when embodied in a camera shutter such as shown in FIG. 1.

The shutter has a shutter base plate 1 with an aperture 1a formed therein for exposures on a film (not shown), the base plate 1 being provided on a top side with a recess 1b for fitting engagement with the view finder of a camera. A cover plate 2 is supported over the base plate 1 by means of a plurality of posts 2a, there being a space between the base plate 1 and the cover plate 2.

An opening blade assembly for starting exposure comprises an opening slit-forming blade 3a having an edge for providing a slit, and a covering blade 3b, the blade 3a eing pivotally supported on an opening member 4 and on a subsidiary opening member 5 respectively by means of a pair of pins 4a and 5a, and the blade 3b being pivotally supported on the opening member 4 and on the subsidiary opening member 5 respectively by means of a pair of pins 4b and 5b.

The opening member 4 and the subsidiary opening member 5 are pivotally supported on the base plate 1 by means of a pair of pivots 4c and 5c, respectively. The opening member 4 is normally urged to pivot clockwise as viewed in FIG. 1 about the pivot 4c by means of an opening spring 4e. The opening member 4 has an arm 4d engaged by an opening hook member 6 which is pivoted to the base plate 1 by a pivot 6a and is normally biased to turn counterclockwise about the pivot 6a by an unshown spring, the hook member 6 having an arm 6b.

An opening drive member 7 is slidably supported on and over the base plate 1 by a pair of pins 7a and 7b on the base plate 1 that extend loosely through a pair of slots 7c and 7d in the member 7, respectively. The opening drive member 7 is normally urged to move upwardly as viewed in FIG. 1 by a third spring 7e and also by the spring 4e having one end connected to the member 7. The drive member 7 has a projection 7f engaged by a hook member 8 against the biasing force of the springs 4e, 7e. The hook member 8 is pivoted to the base plate 1 by a pivot 8a and is normally biased to turn clockwise about the pivot 8a by an unshown spring, the hook member 8 having an arm 8b. The opening drive member 7 is formed with a stepped portion 7g engageable with a pin 4f on the opening member 4 on which pin the opening spring 4e acts.

A closing blade assembly for finishing exposure comprises a closing slit-forming blade 9a having an edge for providing a slit, and a covering blade 9b, the blade 9a being pivotally supported on a closing member 10 and on a subsidiary closing member 11 respectively by means of a pair of pins 10a and 11a, and the blade 9b being pivotally supported on the closing member 10 and on the subsidiary closing member 11 respectively by means of a pair of pins 10b and 11b.

The closing member 10 and the subsidiary closing member 11 are pivotally supported on the base plate 1 by means of a pair of pivots 10c and 11c, respectively. The closing member 10 is normally urged to pivot counterclockwise about the pivot 10c by means of a first spring 10e. The closing member 10 has an arm 10d engaged by a closing hook member 12 which is pivoted to the base plate 1 by a pivot 12a and is normally biased to turn clockwise about the pivot 12a by an unshown spring, the closing member 10 having an arm 10g.

A closing drive member 13 is slidably supported on and over the base plate 1 by a pin 13b and the pin 7b on the base plate 1 that extend loosely through a pair of slots 13d and 13c in the member 13, respectively. The closing drive member 13 normally urged to move downwardly as viewed in FIG. 1 by a second spring 13e and also by the first spring 10e having one end connected to the member 13. The drive member 13 has a projection 13f engaged by a hook member 14 against the biasing force of the springs 10e, 13e. The hook member 14 is pivoted to the base plate 1 by a pivot 14a and is normally biased to turn counterclockwise about the pivot 14a by an unshown spring. The closing drive member 13 is formed with a stepped portion 13g engageable with a pin 10f on the closing member 10 on which pin the first spring 10e acts. The drive member 13 also has a projection 13h engageable with the arm 8b of the hook member 8.

the operation of the shutter thus constructed will be described below.

Upon actuation of a camera release button to release the shutter, the closing hook member 12 is turned counterclockwise about the pivot 12a against the bias of the unshown spring to release the arm 10d of the closing member 10 out of engagement with the hook member 12, when the closing member 10 is pivoted counterclockwise about the pivot 10c under the bias of the first spring 10e. With the closing member 10 thus pivoted counterclockwise, the subsidiary closing member 11 is also privoted counterclockwise about the privot 11c, and they jointly force the closing blades 9a and 9b to move upwardly as viewed in FIG. 1 from a first position shown in FIG. 1 in overlapped relation to a second position in which the blades 9a, 9b uncover the aperture 1a. Before counterclockwise movement of the closing member 10 comes to an end, the arm 10g engages with the arm 6b of the opening hook member 6 which in turn is privoted clockwise about the privot 6a against the force of the unshown spring to disengage the arm 4d of the opening member 4 from the opening hook member 6.

The opening member 4 is then turned clockwise about the pivot 4c under the bias of the opening spring 4e and cooperates with the subsidiary opening member 5 in moving the opening blades 3a and 3b downwardly, thereby uncovering the aperture 1a to start an exposure. At this time, the opening slit-forming blade 3a and covering blade 3b are operated by the opening members 2 and 5 to travel varying strokes downwardly in overlapped relation.

Upon lapse of a desired exposure duration, the hook member 14 is pivoted clockwise about the pivot 14a by a suitable known means against the unshown spring to release the projection 13f of the closing drive member 13 out of engagement with the hook member 14. The closing drive member 13 is then pulled by the second spring 13e to move downwardly, the movement being confined by the slots 13c, 13d. The stepped portion 13g pushes the pin 10f downwardly to thereby turn the closing member 10 clockwise about the pivot 10c. The closing member 10 and the cooperating subsidiary closing member 11 jointly force the closing blades 9a and 9b downwardly from the second position in which they are overlapped down to the first position in which they cover the aperture 1a, thus bringing the exposure to an end.

The closing drive member 13, before arrival at the end of downward stroke, engages at the projection 13h with the arm 8b of the hook member 8 to turn the latter counterclockwise about the pivot 8a against the unshown spring. The hook member 8 is then disengaged from the projection 7f of the opening drive member 7 which in turn is moved upwardly under the force of the spring 7e, the movement being limited by the slots 7c, 7d. As the opening drive member 7 moves upwardly, the stepped portion 7g pushes the pin 4 upwardly to thereby turn the opening member 4 counterclockwise about the pivot 4c. The opening member 4 and the associating subsidiary opening member 5 jointly returns the opening blades 3a and 3b to the illustrated position in which they cover the aperture 1a. One cycle of shutter operation is thus completed.

It should be noted that since the opening drive member 7 can be biased by the second spring 13e, the spring 7e may be dispensed witgh. Furthermore, the opening drive member 7 can be eliminated. In this case, one cycle of shutter operation is completed with the opening blades 3a, 3b overlapped downwardly of the aperture 1a.

To retain the shutter again in a charged position, or the position shown in FIG. 1, the opening hook member 6 and the closing hook member 12 are first held in the illustrated position for locking engagement with the opening member 4 and the closing member 10, respectively. Then, the opening drive member 7 is pushed downwardly against the bias of the springs 4e, 7e until the projection is locked by the hook member 8. Likewise, the closing drive member 13 is pushed upwardly against the bias of the springs 10e, 13e until the projection is locked by the hook member 14.

Figure 2:
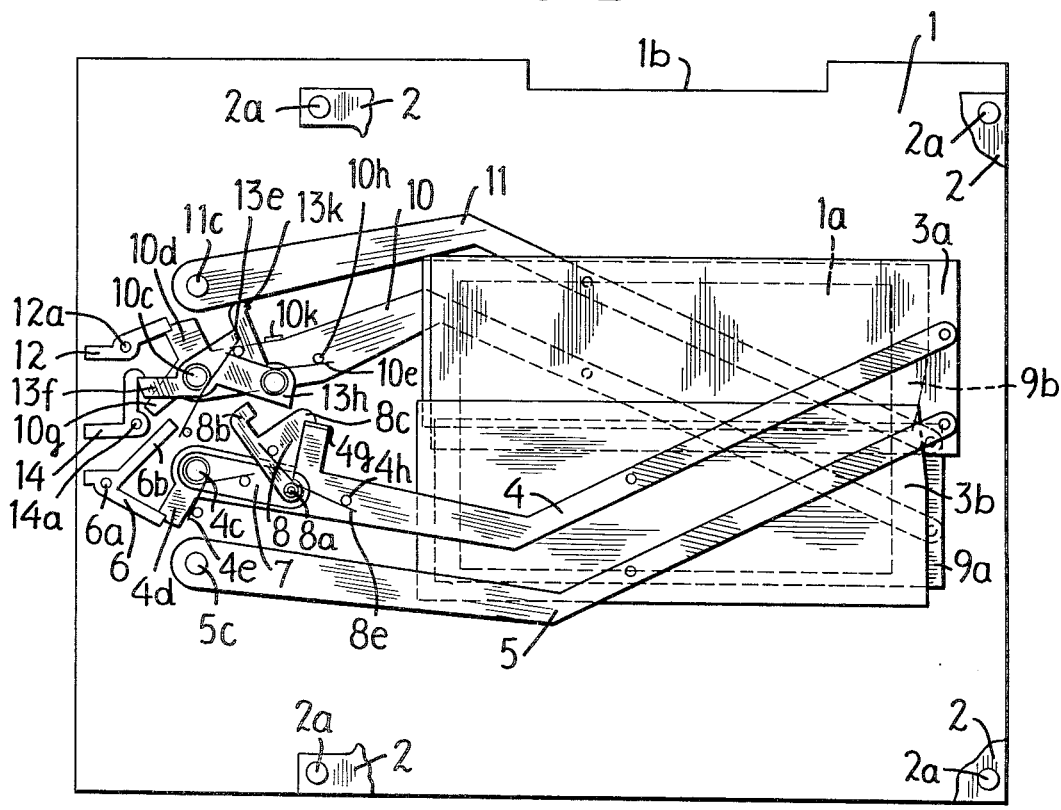
FIG. 2 is a plan view of a shutter according to a second embodiment, the shutter being in a charged position.

FIG. 2 shows a second embodiment in which the opening member 4 is provided with an arm 4g and a pin 4h, and the opening drive member 7 fits over the pivot 4c and is normally urged to pivot clockwise as viewed in FIG. 2 about the pivot 4c by means of a spring 4e. The free end of the opening drive member 7 has a pivot 8a on which a hook member 8 is rotatably supported. The hook member 8 is biased to pivot clockwise by a spring 8e acting on the pin 4h. The hook member 8 has a hook 8c normally engaging the arm 4g, and has a bent arm 8b.

The closing member 10 has a pin 10h and an upturned projection 10k, the arm 10d being engaged by the closing hook member 12. A closing drive member 13 is rotatably supported on the pivot 10c and is normally urged to pivot clockwise by a second spring 13e. The closing drive member 13 has a projection 13f engaged by the hook member 14. The closing drive member 13 is provided with a hook 13k and a projection 13h, there being a first spring 10e acting between the pin 10h and the drive member 13. The projection 13h is engageable with the bent arm 8b.

When the shutter is to be released, the closing hook member 12 is turned counterclockwise against its spring bias to disengage itself from the arm 10d. The closing member 10 is then turned counterclockwise about the pivot 10c under the bias of the first spring 10e to move the closing blades 9a and 9b upwardly from the aperture 1a until the upturned projection 10k abuts against the hook 13k. Just before upward movement of the closing member 10 is terminated, the arm 10g pushes the arm 6b of the opening hook member 6 to release the opening member 4.

The opening member 4, together with the opening drive member 7, is pivoted clockwise about the pivot 4c under the force of the spring 4e, with the arm 4g being engaged by the hook 8c, to thereby shift the opening blades 3a and 3b out of the aperture 1a to commence an exposure.

Upon lapse of a desired length of time, the hook membe 14 is turned counterclockwise by a suitable known means to let the second spring 13e turn the closing drive member 13 clockwise about the pivot 10c. The hook 13k then pushes the projection 10k downwardly to displace the closing blades 9a and 9b to a position in which they cover the aperture 1a in order to end the exposure. Just before the closing drive member 13 completes its stroke, the projection 13h pushes the bent arm 8b to release the hook 8c of engagement with the arm 4g, when the opening member 4 is pivoted counterclockwise about the pivot 4c under the resiliency of the spring 8e to thereby shift the opening blades 3a and 3b to a position in which they cover the aperture 1a again. Thus, one cycle of shutter operation is completed. However, as in the previous embodiment, the opening blades 3a, 3b need not be returned for shutter closing operation.

When the shutter is to be charged again, the opening drive member 7 is turned counterclockwise about the pivot 4c against the bias of the spring 4e to bring the hook 8c into engagement with the arm 4g, and the arm 4d is pivoted into engagement with the opening hook member 6. With the arm 10d of the closing member 10 engaged by the hook member 12, the closing drive member 13 is pivoted counterclockwise against the spring 13e until the projection 13f is locked by the hook member 14.

Figure 3:
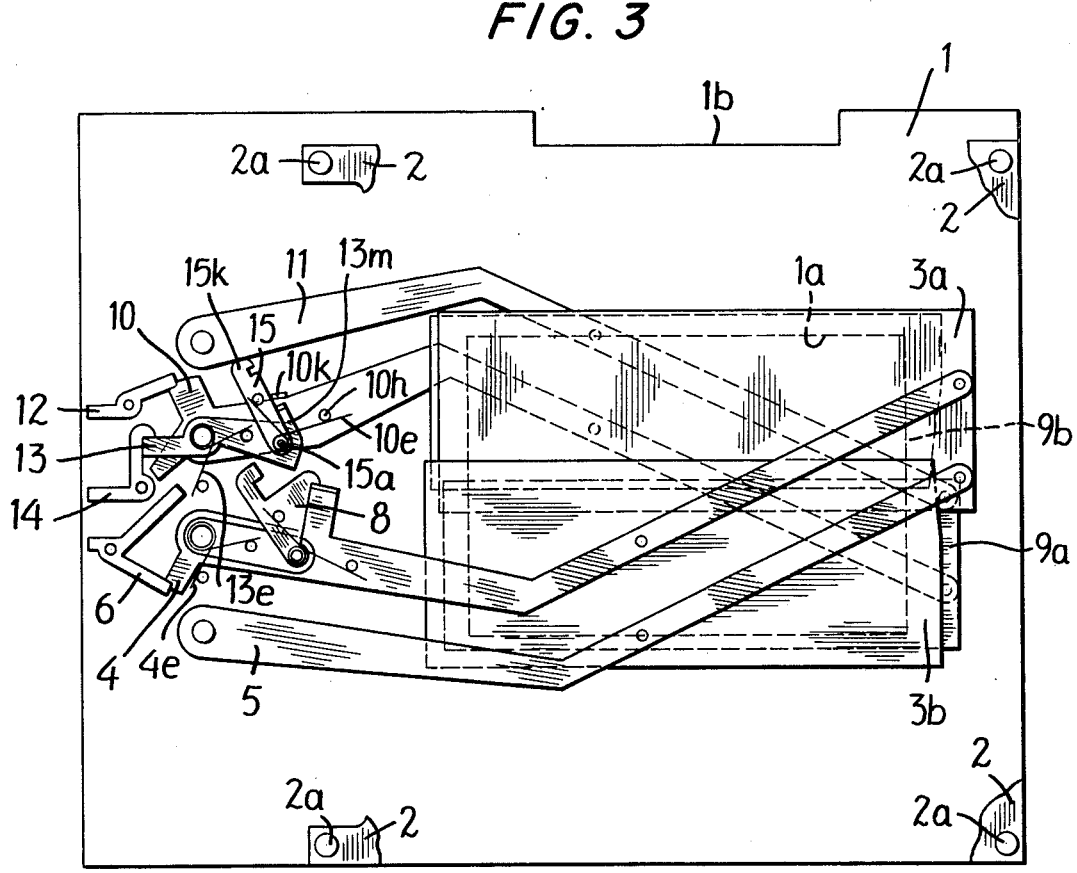
FIG. 3 is a plan view of a shutter of a third embodiment, the shutter being shown charged.

According to a third embodiment shown in FIG. 3, the closing drive member 13 utilizes a separate hook plate 15 instead of the hook 13k, the hook plate 15 being pivotally supported on the closing drive member 13 by means of a pin 15a. The hook plate 15 is normally biased to turn clockwise as viewed in FIG. 3 by the second spring 10e acting between the pin 10h on the closing member 10 and the hook plate 15. The hook plate 15 thus bears upon an upturned projection 13m on the closing member 10. The hook 15k is provided with a recess for receiving the projection 10k against bounding when the closing member 10 displaces the closing blades 9a, 9b toward the position wherein they uncover the aperture 1a. Operation of the shutter according to the third embodiment is substantially the same as with the second embodiment, and for that reason is omitted.

Figure 4:
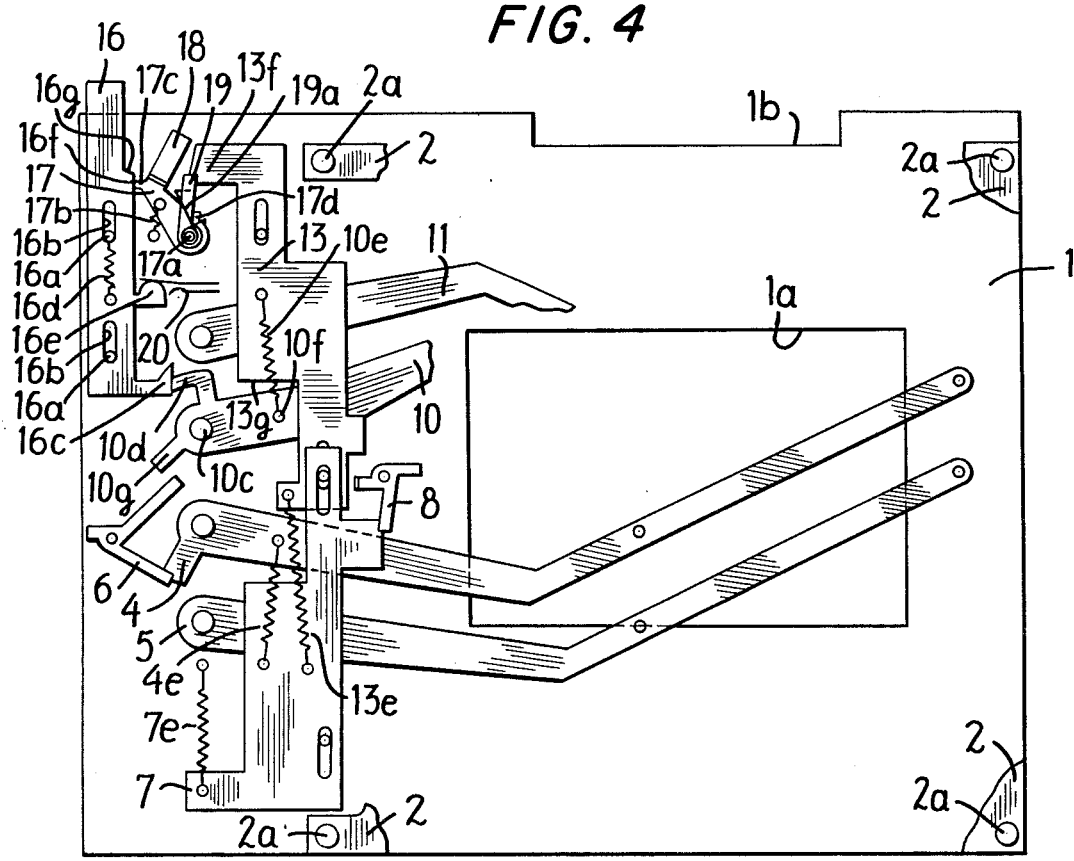
FIG. 4 is a plan view of a shutter constructed in accordance with a fourth embodiment, the shutter being charged.

A fourth embodiment shown in FIG. 4 comprises a release lever 16 which replaces the closing hook member 12 and the hook member 14 illustrated in FIG. 1. The release lever 16 has a hook 16c with its end face engaging the arm 10d, and is slidably supported on the base plate 1 that extend through a pair of slots 16b, 16b, respectively. The release lever 16 is normally urged to move upwardly as viewed in FIG. 4 by a spring 16d acting between one of the pins 16a and the release lever 16. The release lever 16 is formed with a projection 16e and a stepped portion 16f, there being a ledge 16g upward of the stepped portion 16f.

An iron lever 17 is rotatably supported on the base plate 1 by means of a pivot 17a and is normally urged to pivot counterclockwise as viewed in FIG. 4 about the pivot 17a by means of a spring 17b acting between the base plate 1 and the lever 17. The lever 17 has a prong 17c abutting against the stepped portion 16f, and is attracted against the biasing force of the spring 17b to an electromagnet 18 during energization of the latter. A locking member 19 fits over the pivot 17a is normally biased to pivot clockwise by a spring 19a into abutment against an upturned projection 17d of the iron lever 17, the locking member 19 being held in locking engagement with the projection 13f of the closing drive member 13. A switch 20 is arranged to be operated by the projection 16e of the release lever 16. The opening and closing blade assemblies are of the same construction as in the preceding embodiments, and are not illustrated for clarity.

Operation of the shutter constructed in accordance with the fourth embodiment is as follows: When the release lever 16 is pressed down against the bias of the spring 16d, the projection 16e is retracted to close the switch 20 which in turn energizes the electromagnet 18 to attract the iron lever 17. Continued downward movement of the release lever 16 causes the arm 10d to be released of engagement with the hook 16c, whereupon the closing member 10 displaces the closing blade assembly upwardly to the position in which it uncovers the aperture 1a. With the arm 10 approaching the end of its stroke, the arm 10g engages the opening hook member 6 which then pivots out of engagement with the opening member 4, thereby initiating an exposure.

Upon lapse of a desired exposure duration, the electromagnet 18 is de-energized by a suitable known means to permit of counterclockwise rotation of the iron lever 17 about the pivot 17a under the force of the spring 17b, when the upturned projection 17d causes the locking member 19 to disengage from the projection 13f.

The closing drive member 13 is then forced to move downwardly by the spring 13e with the stepped portion 13g engaging the pin 10f. With the downward movement of the pin 10f the closing member 10 is turned clockwise about the pivot 10c to enable the closing blade assembly to close the aperture 1a to thereby complete the exposure. The downward movement of the closing drive member 13 is followed by returning movement of the opening drive member 7 as in the first embodiment to finish one cycle of shutter operation.

The switch 20 is kept closed while the release lever 16 is held in the most lowered position by the hook 16c caught under the arm 10d. Upon clockwise rotation of the closing member 10, the release lever 16 is returned upwardly to open the switch 20, thereby holding electric current consumption at a minimum.

In case of a failure of energization of the electromagnet 18 due to disconnection of the cell or malfunctioning of the circuit or cell, as the release lever 16 moves downwardly, the iron lever 17 is allowed to turn counterclockwise under the bias of the spring 17b with the prong 17c sliding over the stepped portion 16f. As the release lever 16 is pushed down further, the ledge 16g becomes engaged by the prong 17c to prevent continued downward movement of the release lever 16. Thus, the camera operator is given a warning that expected shutter operation will not be effected. A way of bringing the parts to a charged position is substantially the same as in the first embodiment and, hence, its description is not necessary. Also, returning movement of the opening blade assembly is not required for one cycle of shutter operation.

In the fourth embodiment, the closing member 10 can be swung under the action of the spring 10e by actuation of a camera button, rising of the mirror of or diaphragming of the stop of a single lens reflex camera, or movement of a previously traveling member before shutter operation for an exposure.

The opening member 4 can also be released by rising of the mirror of or diaphragming of the stop of a single lens reflex camera, movement of a previously traveling member before shutter operation for an exposure, or can be released after a predetermined period of time through an electrical delay. The opening member 4 can also be returned, after finishing an exposure, by movement of the closing member 10, lowering movement of the mirror of a single lens reflex camera, returning movement of a camera release button, or can be returned after a predetermined period of time through a mechanical or electrical delay. A prime mover for returning the opening member 4 is not limited to the spring 7e. It may be the spring 13e, the spring 4e or 10e which is subject to reversing, returning forces of the release button, or mirror lowering forces.

In FIG. 5, electrical contacts 515 are provided in the shutter according to the first embodiment. To release the shutter, the closing hook member 12 is swung counterclockwise about the pivot 12a against the unshown spring to close the electrical contacts 515 located adjacent to the closing hook member 12. The arm 10d of the closing member 10 is relieved of engagement with the closing hook member 12, and the closing member 10 is turned counterclockwise about the pivot 10c under the biasing force from the first spring 10e. Exposure operation is effected by the parts actuated in the same order as in the first embodiment. When the closing member 10 is returned to the illustrated position wherein the closing blades 9a, 9b cover the aperture 1a, the electrical contacts 515 are opened again. The shutter is charged in the same way as in the first embodiment. According to a modification shown in FIG. 6, electrical contacts 616 are closed by the projection 10g of the closing member 10 when the latter is in the charged position. When the closing member 10 gets out of engagement with the closing hook member 12, the electrical contacts 616 become opened upon disengagement from the projection 10g of the closing member 10. With this arrangement, the electrical contacts 616 close after an exposure is finished. Said contacts 515, 616 may be replaced with the switches of reversed mode the electrical contacts 515 are used as the power switch for the electrical circuit in a camera, or as the contacts for synchronization with a flash bulb having a long delay time. The electrical contacts 616 are used as the trigger contacts in a delay switching circuit for an electronic shutter.

With the arrangements of the present invention, since the closing blade assembly is disposed and held in place away from the view finder of a camera before or after shutter operation for an exposure, the view finder can be located adjacent to the aperture. The view finder can be positioned without any practical inconvenience in a space for accommodating the closing blade assembly, so that the camera can be reduced in size. The opening slit-forming blade 3a and the covering blade 3b that cover the aperture when charged can also be reduced in size by holding their overlapping portion at a minimum. Thus, the size of a camera can be decreased further.

The closing blade assembly is moved away from the aperture 1a faster than is possible with conventional shutters. Therefore, even if the closing blade assembly is released independently of release of the mirror or diaphragm of a single lens reflex camera, the completion of rising-up of a mirror and the stabilized operation of diaphragm blades can be carried out in substantially proper time series relation with starting of the opening blade assembly, thereby simplifying interlocking parts in between. Furthermore, the shutter can easily be synchronized with a flash bulb having a long delay time.

According to the invention, a time duration can be longer after the mirror is up in a camera of the type in which exposure control is based on reflection from the shutter blade surface or the film surface after the mirror is up. Accordingly, the responsiveness of a light receiving element is not adversely affected practically upon illumination after darkness, with the result that a more inexpensive light receiving element can be used. In addition, because the shutter can be arranged to be released without interlocking relation to rising-up of the mirror, the mirror is simple in construction in a motor-driven camera in which the shutter can operate with the mirror up. During an exposure, the view finder is obstructed by the closing blade assembly, so that light can be prevented from entering through the view finder and, hence, from adversely affecting exposure control. After completion of an exposure, the opening blade assembly is returned and covers the aperture to protect against double exposure which would occur when the closing blade assembly bounds.

With the construction illustrated in FIGS. 5 and 6, the electrical contacts are opened and closed for a desired delay time by operation of the closing blades that are constructed to reduce the size of and enhance the light-interrupting characteristic of a shutter. According to the invention, no special delay for the contacts is required which delay would otherwise be necessary with prior art shutters having the closing blades thus operated. The present invention is also applicable to a shutter having a pair of opening and closing blades.

It should be understood that the structures herein described are merely illustrative of the principles of this invention and that modifications may be made without departing from the scope of the appended claims.

What is claimed is:

1. A camera shutter comprising an opening blade and a closing blade operated sequentially to open and close a shutter aperture for an exposure, and blade opening and closing mechanism comprising: an opening spring normally biasing the opening blade to move from a closed position in which the opening blade covers the shutter aperture to an open position in which the opening blade uncovers the shutter aperture; a second spring normally biasing the closing blade to move from a closed position in which the closing blade covers the shutter aperture to an open position in which the closing blade uncovers the shutter aperture; a third spring normally biasing the closing blade to move from said open position to said closed position, and means controlling operation of the blades in the manner that when the shutter is in charged condition said opening blade and said closing blade are in said closed position and when the shutter is released, the closing blade is moved under the bias of said second spring from said closed position to said open position, then the opening blade is moved under the bias of said opening spring from said closed position to said open position, and thereafter said closing blade is returned under the bias of said third spring from said open position to said closed position, thereby completing the exposure.

2. A camera shutter according to claim 1, further including a fourth spring normally biasing the opening blade to move from said open position to said closed position, the opening blade being movable under the bias of said fourth spring responsive to the completion of the exposure.

3. A camera shutter according to claim 2, comprising an opening driving member associated with said opening blade, said fourth spring biasing said opening driving member to move from a first position to a second position and thereby move said opening blade from said open position to said closed position, catch means for holding said opening driving member in said first position, and means actuated by said closing blade near the end of its movement from said open position to closed position to release said opening driving member from said catch means for movement from said first position to said second position to move said opening blade from said open position to said closed position.

4. A camera shutter according to claim 2, comprising an opening driving member associated with said opening blade, said opening spring biasing said opening driving member to move from a first position to a second position, latch means coupling said opening driving member with said opening blade to move said opening blade from said closed position to said open position upon movement of said opening driving member from said first position to said second position, and means actuated by said closing blade near the end of its movement from said open position to said closed position to release said opening blade from said latch means for movement by said fourth spring from open position to closed position.

5. A camera shutter according to claim 1, further including electrical contacts operable by said mechanism which become closed as the closing blade starts moving from said closed position to said open position, said electrical contacts becoming opened as the closing blade returns from said open position to said closed position after the opening blade uncovers the aperture.

6. A camera shutter according to claim 1, further including electrical contacts operable by said mechanism which become opened as the closing blade starts moving from said closed position to said open position, said electrical contacts becoming closed as the closing blade returns from said open position after the opening blade uncovers the aperture.

7. A camera shutter according to claim 1, comprising a closing driving member associated with said closing blade, and a third spring biasing said closing driving member to move from a first position to a second position and thereby move said closing blade from said open position to said closed position, and catch means for holding said closing driving member in said first position, said catch means being releasable after a selected exposure time to release said closing driving member for movement by said third spring from said first position to said second position to move said closing blade from open position to closed position.

8. A camera shutter according to claim 7, comprising an electromagnet having spring biased armature connected with said catch for releasing said catch when said electromagnet is deenergized, a release lever, switch means operable by said release lever to energize said electromagnet, second catch means for holding said closing blade in closed position against the bias of said second spring, and means on said release lever for actuating said second catch to release said closing blade for movement by said second spring from said closed position to said open position.

9. A camera shutter according to claim 1, comprising catch means for holding said opening blade in said closed position against the bias of said opening spring and means actuated by said closing blade near the end of its opening movement to release said opening blade from said catch means for movement from said closed position to said open position by said opening spring.

* * * * *